May 31, 1938. A. J. FUCHS 2,118,884
HEATING AND COOLING SYSTEM FOR TRAILER VEHICLES
Filed Dec. 16, 1936    3 Sheets-Sheet 1
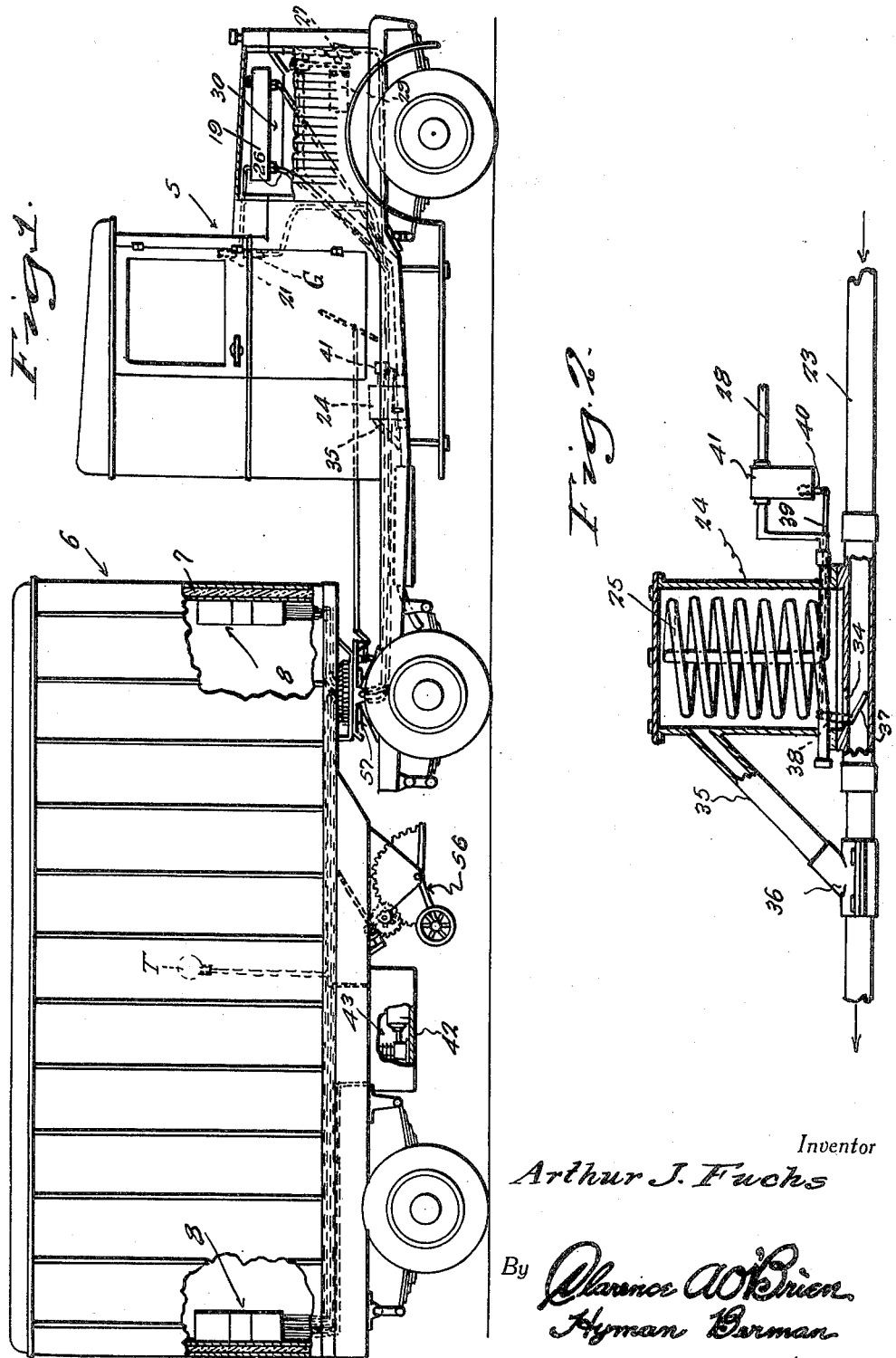
Inventor
Arthur J. Fuchs
By Clarence A. O'Brien
Hyman Berman
Attorneys

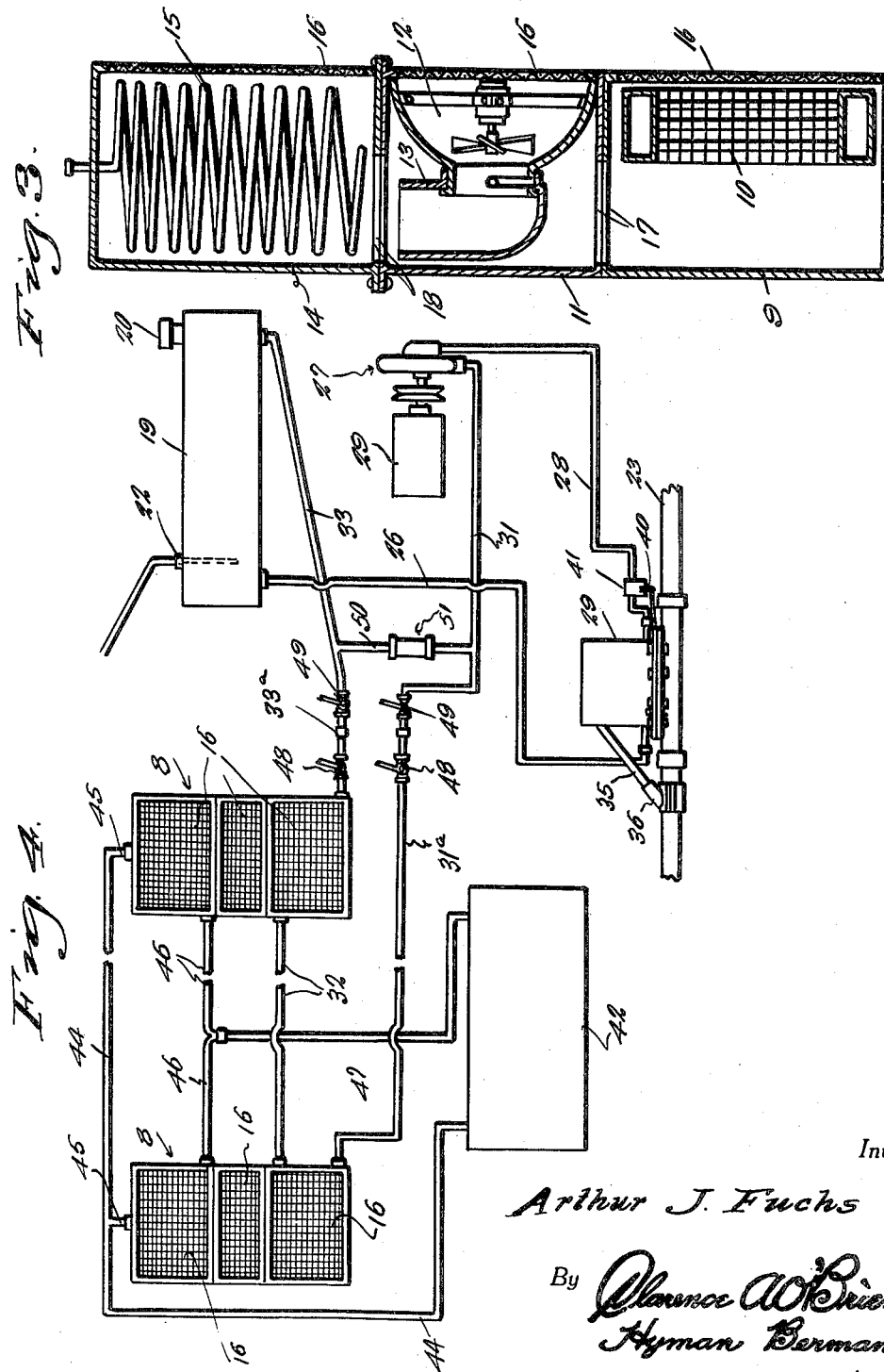

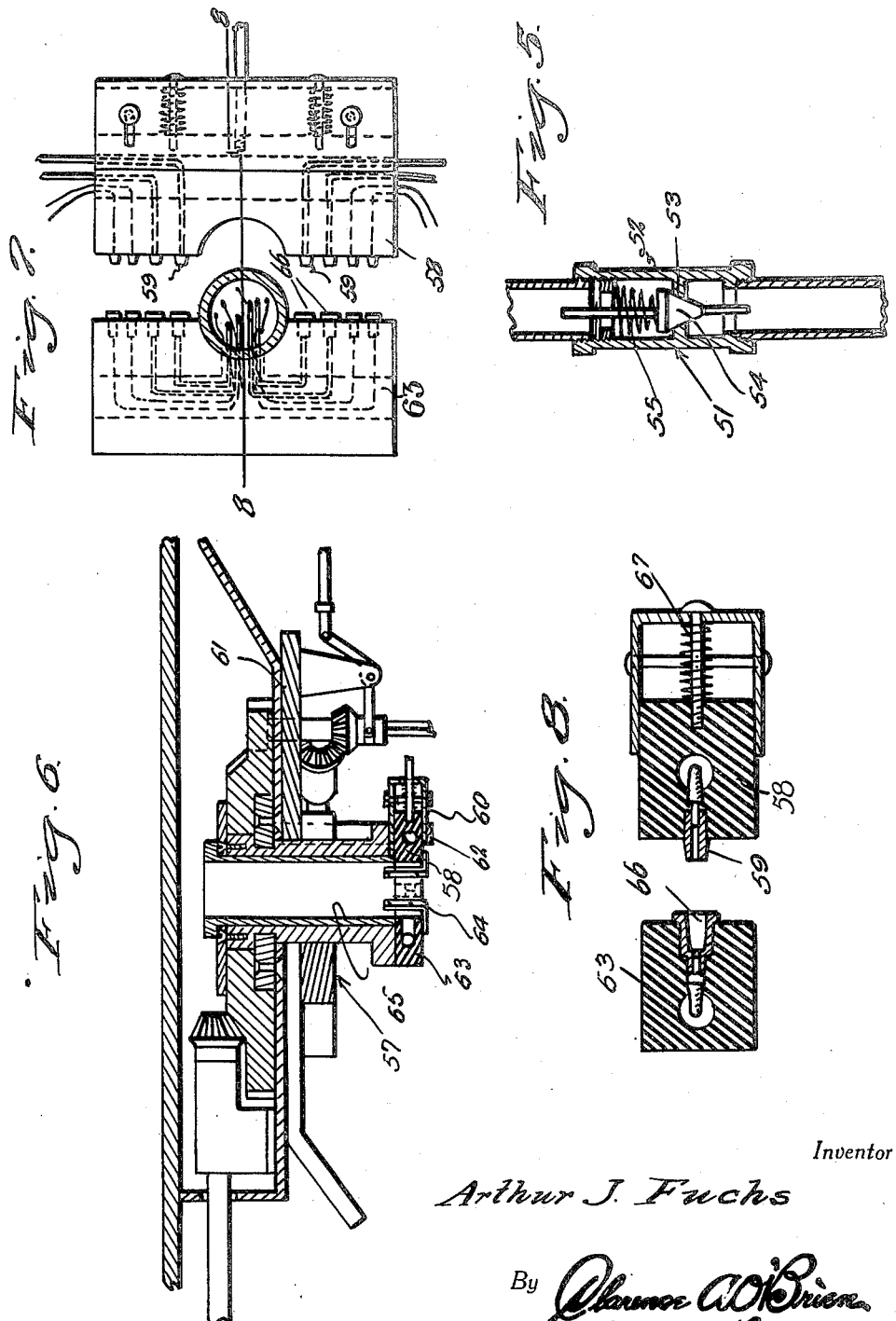

Patented May 31, 1938

2,118,884

UNITED STATES PATENT OFFICE 2,118,884

HEATING AND COOLING SYSTEM FOR TRAILER VEHICLES

Arthur J. Fuchs, St. Louis, Mo.

Application December 16, 1936, Serial No. 116,175

6 Claims. (Cl. 257—7)

This invention relates broadly to trailer vehicles and more particularly to apparatus and a system for heating or cooling the interior of the trailing vehicle as found desirable.

The invention together with its objects and advantages will be best understood from a study of the following description taken in connection with the accompanying drawings wherein:—

Figure 1 is a side elevational view with parts broken away and shown in section illustrating the application of the invention.

Figure 2 is an enlarged detail view partly in section and partly in elevation illustrating certain details of the heating system and showing the manner in which the exhaust gases of an internal combustion engine may be used for heating a circulating medium such as water or the like.

Figure 3 is a vertical sectional view through a casing structure and assembly hereinafter more fully referred to.

Figure 4 is a diagrammatic view of the heating and cooling system.

Figure 5 is a sectional view showing a check valve assembly hereinafter more fully referred to.

Figure 6 is a vertical sectional view through a fifth wheel assembly.

Figure 7 is a plan view of an assembly for connecting the conduits of the heating system, the air brake lines, and the electrical wires associated with the trailing and leading vehicles.

Figure 8 is a sectional view taken on the line 8—8 of Figure 7.

Referring to the drawings by reference numerals it will be seen that 5 indicates generally the draft or leading vehicle while 6 indicates generally the trailer or trailing vehicle.

In accordance with the present invention the walls of the trailing vehicle 6 are insulated as at 7, the trailer vehicle 6 being particularly designed for transporting goods as may require either a high or low temperature.

Further, in accordance with the present invention there is suitably mounted, preferably adjacent each of the end walls of the body of the trailer vehicle 6 heat exchange assemblies 8. Each of the heat exchange assemblies 8, as clearly shown in Figure 3 comprises a lower casing 9 in which is arranged a suitable radiator 10; an intermediate casing 11 in which is arranged a blower 12 the casing of which has mounted on the outlet end thereof a nozzle 13; and a top casing 14 in which is arranged a coil 15 through which a refrigerant medium circulates.

At the side thereof facing into the interior of the body of the trailer vehicle 6 the casings 9, 11 and 14 are provided with screens 16.

Further, the top wall of the casing 9 and the bottom wall of the casing 11 are apertured as at 17 to permit the passage of air through these casings. Also the top wall of the casing 11 and the bottom wall of the casing 14 are apertured as at 18 to permit the passage of air through these two casings.

The nozzle 13 is swivelly mounted on the casing of the blower 12 so that it may be directed upwardly as shown in Figure 3 when it is desired to direct the air upwardly through the casing 14, or said nozzle may be directed downwardly when it is desired to direct the air downwardly through the casing 9 depending, of course, whether it is desired to heat or cool the interior of the trailer 6. In this connection it will be understood that the casing 11 at one end thereof may be provided with a hand hole (not shown) through which the hand may be inserted for rotating the nozzle 13 to the desired position of adjustment. A suitable cover or lid for such hand hole will of course be provided.

There is suitably mounted on the leading vehicle 5, preferably under the engine hood and in proximity to the internal combustion engine or motor of the leading vehicle 5 a water tank 19 provided with a suitable filling neck 20. Also suitably mounted on the instrument board within the cabin of the vehicle 5 is a thermometer or other suitable gauge 21 that is also suitably connected as at 22 with the tank 19 so that the temperature of the water in the tank 19 may be readily ascertained by the operator or other occupant of the leading vehicle 5.

The reference numeral 23 indicates a pipe forming part of or connected with the exhaust manifold of the motor of the lead vehicle 5. Suitably mounted on the pipe 23 is a drum or casing 24 in which is arranged a coil 25 which at one end is connected with the tank 19 through the medium of piping 26. At its other end the coil 25 is connected with the inlet of a pump 27 through the medium of piping 28.

The pump 27 is operatively connected with the shaft of the usual generator 29 which in the present instance is driven from the fan shaft of the internal combustion engine 30 of the lead vehicle 5 through the usual belt and pulley drive.

The outlet side of the pump 27 is connected through the medium of pipes 31, 31a with the lower header of the radiator 10 forming part of one of the heat exchange units 8, while the headers of the radiators 10 of said units are connected together through the medium of piping 32. The lower header of the radiator 10 of the other of the heat exchange units or assemblies 8 is connected through the medium of piping 33, 33a, with the tank 19.

For by-passing the exhaust gases through the drum or casing 24 the exhaust pipe 23 is in communication with the drum 24 through the medium of a port 34 while a return conduit 35 for the exhaust gases extends laterally from one side of the drum or casing 24 and is suitably connected as at 36 with the exhaust pipe 23.

For controlling the port 35 there is provided a pivoted valve 37 that opens inwardly of the pipe 23 and the shaft for the valve 37 is provided with a crank arm 38 that is connected through the medium of a link 39 with an arm 40 forming part of a thermostat 41 interposed in the piping 28.

From the description of the invention thus far it will be seen that when it is desired to raise the temperature of the interior of the draft vehicle 6 valve 37 is in the open position shown in Figure 2. With the motor 30 running, pump 27 will be driven by said motor 30 through suitable driving means. This will result in the water being drawn from the tank 19 through piping 26, coil 25, piping 28, the pump 27, piping 31, 31a, through one of the radiators 10, the pipe 32, then through the other radiator 10 and back to the tank 19 through the piping 33a, 33. Thus it will be seen that a continuous forced circulation of water through the radiators 10 is provided for.

Obviously, with valve 37 in the open position shown in Figure 2, the exhaust gases by-passing through the casing 24 and the conduit 35 back to the exhaust pipe 23 will provide heat for heating the water circulating the coil 25.

Further with the blowers 12 in operation the cold air from the interior of the trailing vehicle 6 will be drawn through the casings of the blowers, and nozzles 13 being in a downwardly directed position, the air is directed by the nozzles through the openings 17 and into the casings 9. As the air passes from the casings 9 through the screening 16 back into the trailing vehicle said air is heated by contact thereof with the tubing of the radiator. Thus it will be seen that the temperature of the trailing vehicle will be raised and may be maintained at a relatively high degree.

For preventing overheating of the water there is provided the aforementioned thermostat 41 which will automatically act to move the valve 37 either to a fully closed position or to a desired position of adjustment for controlling the flow of the exhaust gases through the casing or drum 24 in response to the rise or fall of the temperature of the water flowing through the pipe 28.

Also in accordance with the present invention there is suitably mounted on and suspended from the chassis frame of the trailing vehicle 7 a casing 42 in which is arranged an electric refrigerating mechanism indicated generally by the reference numeral 43 and including the usual compressor, etc.

For circulating the refrigerant medium through the coils 15 of the units 8 the mechanism 43 is connected with the inlet ends of the coils 15 through the medium of piping 44, 45 while the outlet ends of the coils 15 are connected with the mechanism 43 through the medium of piping 46, 47. The refrigerating system will be controlled through the medium of a switch suitably located, preferably, on the trailer vehicle 6 or may be located on the instrument panel within the cabin of the lead vehicle 5.

From the description thus far it will be seen that when the cooling system is in operation, the cooling medium will circulate through the coils 15, and with the nozzle 13 in the upwardly extending position shown in Figure 3 the warm air will be drawn from the interior of the trailing vehicle through the screens at the front sides of the casings 11 by the blowers 12 to pass upwardly through the nozzles 13 into the casings 14 where the air is cooled and returned to the interior of the trailing vehicle through the screens 16 at the front sides of the casings 14.

Thus with this apparatus the temperature in the interior of the trailing vehicle 6 may be raised or lowered as found desirable. A temperature gage G mounted on the instrument board of the leading vehicle is suitably connected with a thermometer T in the trailer vehicle so that the temperature of the interior of the trailer may be readily ascertained.

For closing the lines 31a and 33a when the lead and trailer vehicles are uncoupled there are provided in the lines 31a and 33a suitable valves 48. Also for closing the lines 31, 33 when the leading and trailing vehicles are uncoupled there are provided in the lines 31, 33 valves 49.

To provide for the free flow of the fluid from the tank 19 through the pump 27 and back to the tank 19 while the motor 30 is running and the heating system is not in use, or in other words, when the valves 49 are closed, the pipe lines 31, 33 are connected together through the medium of a conduit 50 in which is arranged a check valve assembly 51.

The check valve assembly 51 as shown in Figure 5 comprises a casing 52 suitably interposed in the line 50 and provided with a valve seat 53, a conical valve 54 for engaging the seat 53 and a spring device 55 that is adjustable and tends to yieldably urge the valve core 54 into engagement with its seat 53. Thus it will be seen that when the valves 49 are closed the water pressure in the line 31 will be sufficient to unseat the valve 54 for preventing a closed circulation of the fluid from the tank 19 through the pump 27 and back to the tank.

In the present instance I have shown the trailing vehicle 6 being provided with a landing gear indicated generally by the reference numeral 56 controlled from a suitable fifth wheel assembly indicated generally by the reference numeral 57.

The landing gear 56 and the fifth wheel assembly 57 herein shown form no part of the present invention and constitute the subject matter of my co-pending application Serial No. 101,842, filed by me on the 21st day of September, 1936 and entitled "Trailer landing gear assembly".

Consequently, only such part of the fifth wheel assembly 57 will be herein specifically referred to as believed necessary for an understanding of the present invention. Thus, and as clearly shown in Figures 6 to 8, inclusive, in connection with the fifth wheel assembly 57 there is provided a coupling device for the air brake lines and the conductor cables of the draft and trailer vehicles, and in this instance I have illustrated said coupling device as being used also for coupling pipes 31 and 33 with the pipes 31a and 33a. In this connection it will be noted that the pipes 31, 33 have free end portions suitably accommodated in bores provided therefor in the coupling blocks 58, 63, and at said ends the pipes 31, 33 are provided with male coupling elements 59. The block 58 which is of conductive material is slidably mounted in a channel member 60 suspended from the fifth wheel plate 61 through the medium of a U-shaped bracket 62.

The coupling device which is also more specifically described in my aforementioned co-pending application also includes, complemental to the block 58, a block 63 of insulating material, bolted or otherwise secured as at 64 to the lower end of the king-pin liner sleeve 65.

The block 63 is also suitably bored for receiving one end of the conduit for the air brakes of the trailer vehicle 6 and also for receiving the free ends of the conduits 31, 31a for which conduits the block 63 is also provided with female coupling elements 66 complemental to the male coupling elements 59.

Also the electric cables of the trailer and lead vehicles extend as shown in Figure 7 through the liner sleeve 65 and have their ends accommodated in bores provided therefor in the blocks 58 and 63, and for the terminals of these wires the blocks are equipped with male and female contact elements for electrically connecting the wires of the one vehicle with the wires of the other vehicle.

Also and as more fully described in my copending application suitable spring devices 67 are provided for urging the block 58 toward the block 63 to insure the maintenance of a positive connection between the male and female coupling elements.

It is thought that a clear understanding of the construction, utility and advantages of the invention will be had without a more detailed description thereof.

Having thus described the invention what is claimed as new is:—

1. In a heating and cooling apparatus for vehicles, heat exchange assemblies arranged interiorly of the vehicle, each assembly including a casing structure having a radiator arranged in the bottom thereof, a cooling coil arranged in the top thereof and a blower arranged in an intermediate portion thereof, said blower being arranged to draw air from the interior of the vehicle, and also being provided with a swivelly mounted nozzle adapted to be positioned for directing the air either toward the top or toward the bottom of the casing structure depending upon whether it is desired to heat or cool the interior of the vehicle, refrigerating means connected with the cooling coils for causing a circulation of a cooling medium through said coils, and means connected with said radiators for causing a circulation of hot water through said radiators.

2. In a device for use in either heating or cooling the interior of a vehicle, optionally, a lower casing having a radiator mounted therein, an intermediate casing resting on said lower casing and having a blower arranged therein and provided with a swivelly mounted nozzle, and an upper casing arranged on said intermediate casing and having a circulating coil for a cooling medium arranged therein, said casing having the contiguous walls thereof apertured whereby the air drawn in by said blower, upon proper positioning of said nozzle may be directed through either the upper or the lower casing, optionally, and each of said casings being open at one side thereof, and a screen disposed over the open side of each casing.

3. In combination with a motor driven draft vehicle and a trailer vehicle, heat exchange assemblies arranged in the trailer vehicle, each of said assemblies including three superimposed casings including a top, a bottom and an intermediate casing, a circulating coil for a cooling medium arranged in the upper casing, a radiator for the circulation of hot water therethrough arranged in the bottom casing, and a blower arranged in the intermediate casing, the contiguous walls of said casings being apertured and said blower being provided with a swivelly mounted nozzle adapted to be directed either upwardly for directing the air through the upper casing or downwardly for directing the air through the lower casing, optionally, each of said casings being also open at one side thereof and having a screen disposed over the open side, an electric refrigerating apparatus mounted on the trailer vehicle and piping connecting said coils together and with said refrigerating apparatus to provide for the circulation of a cooling medium through said coils when it is desired to lower the temperature in the interior of the trailer vehicle, and means for circulating hot water through said radiators.

4. In combination with a motor driven draft vehicle and a trailer vehicle, heat exchange assemblies arranged in the trailer vehicle, each of said assemblies including three superimposed casings including a top, a bottom and an intermediate casing, a circulating coil for a cooling medium arranged in the upper casing, a radiator for the circulation of hot water therethrough arranged in the bottom casing, and a blower arranged in the intermediate casing, the contiguous walls of said casings being apertured and said blower being provided with a swivelly mounted nozzle adapted to be directed either upwardly for directing the air through the upper casing or downwardly for directing the air through the lower casing, optionally, each of said casings being also open at one side thereof and having a screen disposed over the open side, an electric refrigerating apparatus mounted on the trailer vehicle and with said refrigerating apparatus to provide for the circulation of a cooling medium through said coils when it is desired to lower the temperature in the interior of the trailer vehicle, and means for circulating hot water through said radiators, and said hot water circulating means including a pump, means for driving the pump from the motor of the draft vehicle, a water tank mounted on the draft vehicle, piping connecting the inlet side of said pump with said tank, other piping connecting the outlet side of said pump with one of the radiators, and still other piping connecting the other of the radiators with said tank, and piping connecting said radiators together whereby to provide for a closed water circuit through the radiators, and means for heating the water in said circuit from the hot exhaust gases of the motor.

5. In combination with a motor driven draft vehicle and a trailer vehicle, heat exchange assemblies arranged in the trailer vehicle, each of said assemblies including three superimposed casings including a top, a bottom and an intermediate casing, a circulating coil for a cooling medium arranged in the upper casing, a radiator for the circulation of hot water therethrough arranged in the bottom casing, and a blower arranged in the intermediate casing, the contiguous walls of said casings being apertured and said blower being provided with a swively mounted nozzle adapted to be directed either upwardly for directing the air through the upper casing or downwardly for directing the air through the lower casing, optionally, each of said casings being also open at one side thereof and having a screen disposed over the open side, an electric refrigerating apparatus mounted on the trailer vehicle and piping connecting said coils together and with said refrigerating apparatus to provide for the circulation of a cooling medium through said coils when it is desired to lower the temperature in the interior of the trailer vehicle, and means for circulating hot water through said radiators, and said hot water circulating means including a pump, means for driving the pump from the motor of the draft vehicle, a water tank mounted on the draft vehicle, piping connecting the inlet side of said pump with said tank, other piping connecting the outlet side of said pump with one of the radiators, and still other piping connecting the other of the radiators with said tank, and piping connecting said radiators together whereby to provide for a closed water circuit through the radiators, and means for heating the water in said circuit from the hot exhaust gases of the motor, said means including an exhaust pipe, a casing mounted on said exhaust pipe, said exhaust pipe having an opening therein through which the exhaust gases pass from the pipe into said casing, a return conduit for the exhaust gases connecting said casing with the exhaust pipe, a water circulating coil arranged in said casing, and interposed in the piping connecting the water tank with the inlet side of said pump.

6. In combination with a motor driven draft vehicle and a trailer vehicle, heat exchange assemblies arranged in the trailer vehicle, each of said assemblies including three superimposed casings including a top, a bottom and an intermediate casing, a circulating coil for a cooling medium arranged in the upper casing, a radiator for the circulation of hot water therethrough arranged in the bottom casing, and a blower arranged in the intermediate casing, the contiguous walls of said casings being apertured and said blower being provided with a swively mounted nozzle adapted to be directed either upwardly for directing the air through the upper casing or downwardly for directing the air through the lower casing, optionally, each of said casings being also open at one side thereof and having a screen disposed over the open side, an electric refrigerating apparatus mounted on the trailer vehicle and piping connecting said coils together and with said refrigerating apparatus to provide for the circulation of a cooling medium through said coils when it is desired to lower the temperature in the interior of the trailer vehicle, and means for circulating hot water through said radiators, and said hot water circulating means including a pump, means for driving the pump from the motor of the draft vehicle, a water tank mounted on the draft vehicle, piping connecting the inlet side of said pump with said tank, other piping connecting the outlet side of said pump with one of the radiators, and still other piping connecting the other of the radiators with said tank, and piping connecting said radiators together whereby to provide for a closed water circuit through the radiators, and means for heating the water in said circuit from the hot exhaust gases of the motor, said means including an exhaust pipe, a casing mounted on said exhaust pipe, said exhaust pipe having an opening therein through which the exhaust gases pass from the pipe into said casing, a return conduit for the exhaust gases connecting said casing with the exhaust pipe, a water circulating coil arranged in said casing, and interposed in the piping connecting the water tank with the inlet side of said pump, a valve for controlling the opening in said exhaust pipe, a thermostat arranged in the last-mentioned piping between said water circulating coil and the pump, and means operatively connecting the thermostat with said valve for operating the valve in response to a fluctuation in temperature of the water flowing to the pump.

ARTHUR J. FUCHS.